A. M. GRAY.
INDUCTION MOTOR.
APPLICATION FILED FEB. 28, 1910.
1,049,703.
Patented Jan. 7, 1913.
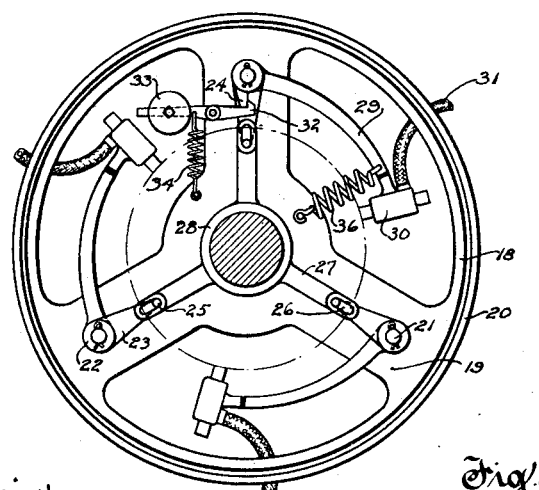
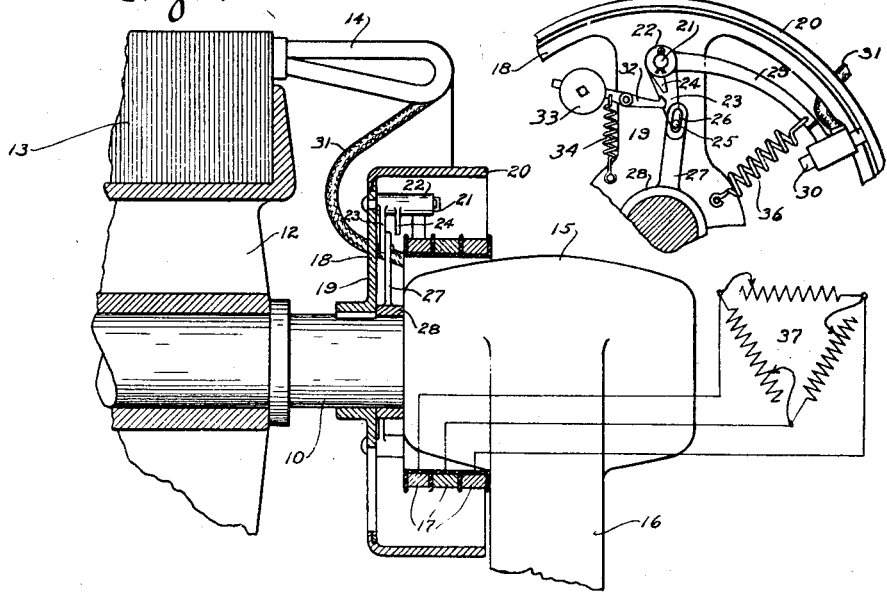
Witnesses
John L. Johnson
Chas. L. Byron
Inventor
Alexander M. Gray
By Chas. E. Lord
Attorney

UNITED STATES PATENT OFFICE.

ALEXANDER M. GRAY, OF MILWAUKEE, WISCONSIN, ASSIGNOR TO ALLIS-CHALMERS COMPANY, A CORPORATION OF NEW JERSEY.

INDUCTION-MOTOR.

1,049,703.  Specification of Letters Patent.  Patented Jan. 7, 1913.

Application filed February 28, 1910. Serial No. 546,543.

*To all whom it may concern:*

Be it known that I, ALEXANDER M. GRAY, a subject of the King of England, residing at Milwaukee, in the county of Milwaukee and State of Wisconsin, have invented certain new and useful Improvements in Induction-Motors, of which the following is a full, clear, and exact specification.

My invention relates to dynamo electric machines, and particularly to induction motors.

It is desirable for the best running conditions of induction motors that the resistance of the closed secondary windings be very low. The low resistance is not advantageous, however, for starting, owing to the fact that the currents induced in the secondary windings are so large that they react upon the field and greatly weaken the same, giving a very low starting torque. If a resistance is inserted in the secondary windings upon starting, the strength of the induced currents is correspondingly reduced and a greater effective starting torque is obtained. It is, therefore, common to insert resistance in circuit with the secondary windings on starting, and to cut this resistance out when the motor has come up to speed. In this manner the requirements of best starting and running conditions are fulfilled.

The object of my invention is to provide a simple and effective arrangement of parts, and easily controlled means for inserting resistance in the circuit of the secondary or rotor windings upon starting and for short-circuiting the windings after the motor has attained a predetermined speed.

My invention consists in certain novel details of construction and combinations and arrangements of parts which will be described in the specification and particularly set forth in the appended claims.

In the accompanying sheet of drawings, Figure 1 is a longitudinal elevation, partly in section, of an induction motor embodying my invention; Fig. 2 is a view of my short-circuiting device in its normal position; and, Fig. 3 is a view of the same in its other extreme position.

Mounted upon the shaft 10 of a dynamo-electric machine is a spider 12 carrying a core 13, preferably laminated, and provided with the usual slots, which receive coils or windings 14, the ends of which project beyond the ends of the core. The shaft 10 rotates in a bearing which is mounted in a bearing housing 15 which is supported by a pedestal 16. Surrounding a portion of the bearing housing 15, secured thereto and insulated therefrom are three stationary slip rings 17 which are insulated from each other. These slip rings are connected to an external variable resistance 37. Mounted upon the shaft 10 and keyed thereto between the bearing housing 15 and spider 12 is a short-circuiting member 18 which has three arms 19 and ring 20 which surrounds the slip ring 17, the ring 20 being concentrically arranged with respect to said slip rings 17. Studs 21 are riveted to these arms and support sleeves 22 each of which has a long projection 23 and one sleeve a shorter projection 24. At the extreme end of each of the long projections 23 is a pin 25 which is adapted to slide in a grooved portion 26 in each of arms 27 mounted on a hub 28 which is loosely fitted and is free to move on the shaft 10 between the short-circuiting member 18 and bearing housing 15. Each of the sleeves 22 is further provided with a long arm 29 provided at its end with an enlarged portion which is adapted to receive a brush 30. These brushes are connected by connectors 31 to the rotor or secondary windings of the induction motor. The brushes are spring-pressed and in their normal positions are held in engagement with the slip rings 17 and are locked in such position by a centrifugally operated device consisting of a latch 32 engaging the small projection 24, as shown in Fig. 2, and having at one end a weight 33. The latch is held in a position locking the brushes 30 in engagement with the slip rings 17 by a spring 34, one end of which is secured to the latch and the other end to a portion of the short-circuiting member 18.

The weight 33 may be shifted in either direction on the latch 32, depending upon the speed at which it is desired to change the connections of the windings relative to the slip rings and short-circuiting rings.

When the motor is at rest or is in a starting position, the brushes to which the secondary windings are connected engage the slip rings 17 which are connected to the external resistance 37. As the motor is speeded up the resistance 37 is cut out of circuit gradually and the weight 33 gradually moves away from the center of rotation, due to the action of centrifugal force, and moves the other end of the pivoted latch in a direction to disengage the small projection 24. At a certain predetermined speed the weight flies out to its extreme position, lowering the latch, the brushes 30 snap out of engagement with the slip rings and into engagement with the short-circuiting ring against the tension of springs 36. The motor at this time is running at full speed and the secondary winding or windings are short-circuited through the short-circuiting ring 20. During this movement of the brushes away from the slip rings, the pins 25 slide in the grooved portions 26 of the arms 27 and the spring 36 is placed under its greatest tension. In order that the brushes 30 remain in contact with the short-circuiting rings it is necessary for the rotor to run at its maximum speed or nearly so. If at any time the rotor speed falls off an appreciable amount, as for instance when the machine is being stopped, centrifugal force will be overcome by the action of the springs 36 and the brushes will break connection with the short circuiting rings and be connected again with the slip rings. At this point the weight 33 will move toward the center of rotation and the latch will again engage the small projection 24, locking the brushes in their normal position, which is in engagement with the slip rings.

By means of the arrangement disclosed in this specification and drawings, simple, effective and desirable operation of induction motors of the rotor wound type is attained.

There may be many modifications of the precise arrangement here shown and described and I aim in my claims to cover all such modifications which do not involve a departure from the spirit and scope of my invention.

What I claim as new is:—

1. In an induction motor, a stationary slip ring, a secondary winding electrically connected to said slip ring, a short-circuiting ring surrounding said slip ring, and means for disconnecting the electrical connections of said secondary winding with said slip ring and for connecting said winding with said short-circuiting ring.

2. In a dynamo-electric machine, the combination of a stationary slip ring, a short-circuiting ring, said rings being concentrically arranged, a winding adapted to be connected to either said slip ring or to said short-circuiting ring, and means for making and breaking said connections.

3. In a dynamo-electric machine, the combination of a stationary slip ring, a short-circuiting ring surrounding said slip ring, a winding adapted to be electrically connected to either said slip ring or short-circuiting ring, and centrifugally operated means for permitting the making and breaking of said connections.

4. In a dynamo-electric machine, the combination of a shaft, a core supported by said shaft, a winding carried by said core, a lead from said winding, a brush terminating said lead, a slip ring with which said brush is normally electrically connected, a short-circuiting ring surrounding said slip ring and with which said brush is adapted to be connected, and means which when operated permit the moving of said brush for changing the connections of said winding from said slip ring to said short-circuiting ring.

5. In an induction motor, a stationary slip ring, a secondary winding electrically connected to said slip ring, a revolving short-circuiting ring surrounding said slip ring, and means for disconnecting the electrical connections of said secondary winding with said slip ring and for connecting said winding with said short-circuiting ring.

6. In an induction motor, the combination of a stationary slip ring, a revolving short-circuiting ring arranged concentrically with respect to said slip ring, a winding adapted to be electrically connected to either said slip ring or short-circuiting ring, and centrifugally operated means for making and breaking said connections.

7. In an induction motor, the combination of a slip ring, a variable resistance connected to said slip ring, a movable short-circuiting ring surrounding said slip ring, a winding adapted to be electrically connected to either said slip ring or short-circuiting ring, and means which when operated permit the making and breaking of said connections.

8. In an induction motor, the combination of a rotatably mounted winding, a brush, a centrifugally operated arm in which said brush is mounted, a slip ring to which said winding is normally connected through said brush, a short-circuiting ring to which said winding is adapted to be connected, a centrifugally operated latch having an adjustable weight thereon, said latch being associated with said brush arm for retaining the electrical connection between said winding and slip ring, and a spring for restraining said weighted latch against centrifugal action up to a predetermined value at which time said brush and winding will be disconnected from said slip ring and connected to said short-circuiting ring.

9. In an induction motor, the combination of a rotatably mounted winding, a stationary slip ring to which said winding is connected;

a rotatably mounted short-circuiting ring surrounding said slip ring and to which said winding is adapted to be connected, and centrifugally operated means for disconnecting said winding and slip ring and connecting said winding and said short-circuiting ring.

Milwaukee, Wis., Feb. 23, 1910.

In testimony whereof I affix my signature, in the presence of two witnesses.

ALEXANDER M. GRAY.

Witnesses:
CHAS. L. BYRON,
ROB. E. STOLL.